Aug. 19, 1952    J. G. LEE    2,607,191
VORTEX PRODUCING MECHANISM FOR MIXING COMBUSTION CHAMBER FLUIDS
Filed Nov. 28, 1947
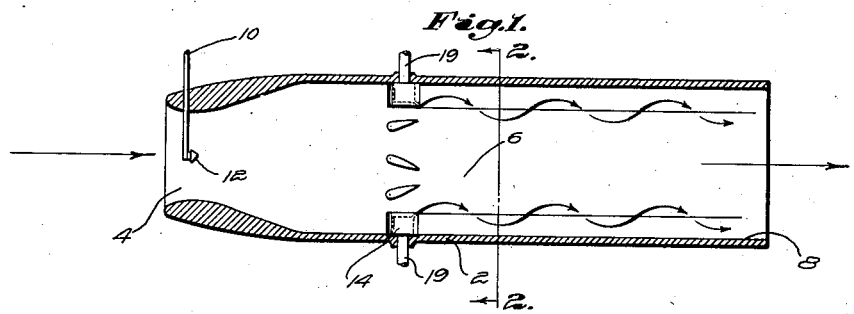
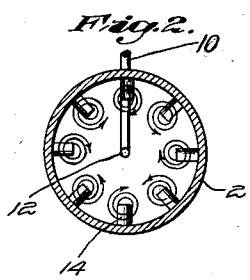
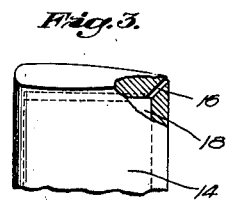
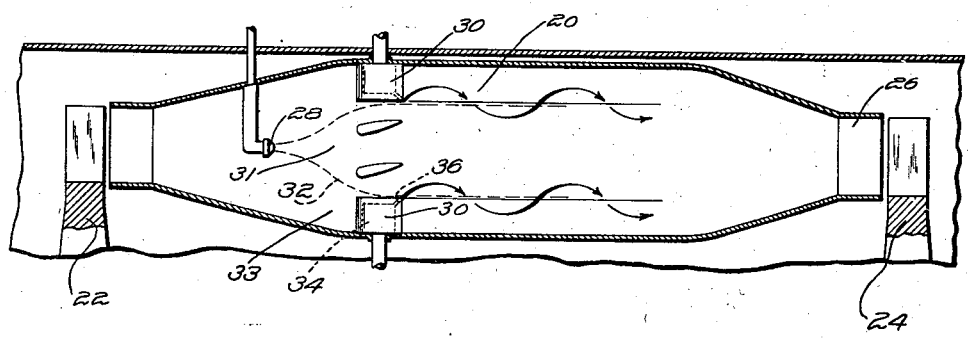
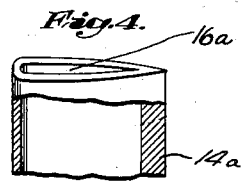
INVENTOR
John G. Lee
BY Charles A. Warren
ATTORNEY Patented Aug. 19, 1952

2,607,191

UNITED STATES PATENT OFFICE 2,607,191

VORTEX PRODUCING MECHANISM FOR MIXING COMBUSTION CHAMBER FLUIDS

John G. Lee, Farmington, Conn., assignor to United Aircraft Corporation, East Hartford, Conn., a corporation of Delaware Application November 28, 1947, Serial No. 788,566

11 Claims. (Cl. 60—35.6)

This invention relates to combustion chambers and particularly to the combustion chambers of ram jets or other types of jet propulsion or gas turbine power plants.

One problem in this type of power plant is the adequate mxing of fuel with air to assure complete combustion within a short distance from the point at which fuel is injected. Mixing of fuel and air has been attempted by treating turbulence in the combustion chamber but with an increase in the resistance to the flow of air through the power plant. A feature of this invention is an arrangement for mixing the fuel and air with a minimum of turbulence by producing a series of vortices, the axes of which are substantially parallel to the flow. Another feature is the introduction of fuel into the combustion chamber adjacent to the axes of the vortices.

A feature of this invention is an arrangement of a flame holder in the form of a series of vanes or airfoils extending into the path of fluid and creating a considerable lift wth the result that a series of strong tip vortices are produced. Another feature is the injection of fuel through the vane and discharging it downstream substantially on the axis of the vortex.

Fuel may be added ahead of the series of vanes, thus providing one fluid which is a mixture of the fuel and air forming a core centrally of the chamber and surrounded by another fluid which is a layer of air. A feature of the invention is the location of the vane tips substantially on the mutual boundary of the two fluids to cause thorough mixing of the two fluids by the resulting vortices.

One feature of the invention is accordingly the mixng of two separate fluids flowing in a duct by creating one or more vortices within the duct with the axis of the vortex substantially parallel to the direction of the flow of the fluids and substantially coincident with the mutual boundary.

Other objects and advantages will be apparent from the specification and claims, and from the accompanying drawing which illustrates an embodiment of the invention.

Fig. 1 is a sectional view through the ram jet.

Fig. 2 is a transverse sectional view through the ram jet of Fig. 1 substantially on line 2—2 of Fig. 1.

Fig. 3 is an enlarged view of the vane, partly broken away to show the fuel passage therein.

Fig. 4 is an enlarged view of a modified vane.

Fig. 5 is a longitudinally sectional view through the combustion chamber for a turbojet or propjet.

The power plant of Fig. 1 is a ram jet in the form of the duct 2 having an air inlet opening 4 at one end, a central combustion chamber section 6, and a thrust nozzle 8 at the downstream end through which the products of combustion discharge as a propulsive jet. Fuel may be admitted through a pipe 10, to a nozzle 12 adjacent the inlet end of the duct.

To assure adequate mixing of the fuel and air for complete combustion of the fuel within the length of the duct, the latter may have, adjacent the forward part of the combustion chamber section, a plurality of vanes 14 in the form of wing tips extending inwardly from the wall of the duct. Each vane is arranged with its chordwise dimension at a substantial angle of attack with respect to the air flowing through the duct thereby to create strong tip vortices at the inner or free spanwise end of the vane which, as shown, is spaced a substantial distance from the wall of the duct. The strong tip vortices cause thorough mixing of the fuel and air and assure complete combustion before the gas reaches the downstream end of the combustion chamber section. The wing tips thus act as a flame holder in causing combustion to occur within the proper part of the duct.

Additional fuel may be admitted to the combustion chamber through passages 16 in the vanes, the discharge end of the passages being located at the downstream end of the wing tip so that the fuel is dscharged into the axis of the tip vortex. It may be advantageous to have the vanes 14 hollow as at 18 with the passage 16 communicating with the opening within the vane. Fuel, or a fuel and air mixture, is admitted to the vanes through pipes 19, and, being discharged directly into the vortex, is thoroughly mixed with the air by the action of the vortices.

Instead of a passage such as 16 in Fig. 3, the vane 14a, Fig. 4, may discharge gaseous fuel through the open end 16a thereof. By this arrangement the fuel is caught in the vortex and describes a spiral mixing path as it proceeds down the combustion chamber.

The same device is applicable to the combustion chamber 20 of a turbojet as shown in Fig. 5 or to a turboprop omitted for convenience. In this figure the compressor 22, represented by the last stage of the compressor rotor, is driven by a turbine 24 represented by one stage of the turbine rotor. Air from the compressor passes through the combustion chamber 20 and is discharged past a row of nozzles 26 against the turbine blades on the rotor. In this arrangement, fuel is discharged into the air in the combustion chamber through a nozzle 28 and is caused to mix with the air by a series of vanes 30 extending inwardly into the combustion chamber adjacent its upstream end. The inner ends of the vanes are spaced from the wall of the combustion chamber and are preferably airfoil in shape. They are arranged with a substantial angle of attack with respect to the flow of air through the combustion chamber to cause the formation of strong tip vortices at the inner ends of the vanes. The vortices have axes of rotation which are parallel to the axis of flow through the combustion chamber thus assuring mixing of the fuel and air such that combustion takes place before the mixture of air and fuel reaches the turbine nozzles.

The fuel nozzle 28 discharges fuel into the central part of the air flowing through the duct and thus in effect produces two separate fluids within the duct. The first fluid is the mixture of fuel and air forming a central core 31, the surface of which is represented by the dotted lines 32, surrounded by an annular body of air 33, with which substantially no fuel is mixed. The mutual boundary between these fluids, the dotted line 32, is quite well defined, and the inner ends of the vanes 30 are preferably located substantially on the mutual boundary of the two fluids. The axes of the vortices produced by the vanes 30 are coincident with this mutual boundary. In this way thorough mixing of the two fluids is assured by the tip vortices.

It may be desirable to further introduce fuel into the burner via the hollow chamber 34 and passage 36 (Fig. 5) in the vanes 30. Thus flame propagation will be more gradual and stable.

It is to be understood that the invention is not limited to the specific embodiment herein illustrated and described, but may be used in other ways without departure from its spirit as defined by the following claims.

I claim:

1. In a combustion chamber, a duct forming the chamber walls and through which air is caused to flow, and vanes extending inwardly and spanwise from said duct with the inner ends thereof spaced from the duct wall, said vanes being arranged with their chordwise dimension at an angle to the longitudinal axis of the duct to cause vortices to develop at the inner ends, at least some of said vanes having passages therein opening into the chamber adjacent the inner ends of the vanes for the discharge of a fluid into the vortex formed by said vane in the chamber.

2. In a combustion chamber, a duct forming the chamber walls, and at least one vane substantially in the form of a wing tip and having its inner spanwise end free and spaced from the wall of the duct and located adjacent to the point where fuel is introduced, said vane having its chordwise dimension arranged at an angle to the direction of air flow through the duct, and a passage in said vane opening into the chamber adjacent to the inner end of the vane through which fuel is admitted to the chamber.

3. In combination, a duct having two fluids flowing therethrough, said fluids having a mutual boundary, at least one element substantially in the form of a wing tip positioned in said duct with one spanwise end free and adjacent to said mutual boundary, said element being arranged with its chordwise dimension at an angle to the direction of flow of the fluids to set up a vortex in the fluids with the axis of the vortex substantially along said boundary thereby mixing them.

4. In combination, a duct having a fluid flowing therethrough, at least one vane of airfoil shape positioned in said duct with one spanwise end free and spaced from the wall of the duct, said vane being arranged with its chordwise dimension at an angle to the direction of flow, and means for introducing another fluid into said duct adjacent to said one end of said vane to cause mixing of the fluids by the vortex created by the flow of fluid over said vane said fluid having at least one boundary lying along the downstream path of said vortex.

5. In combination, a duct having a fluid flowing therethrough, a plurality of vanes of airfoil shape positioned in said duct with one spanwise end of each vane free and spaced from the wall of the duct, each vane being arranged with its chordwise dimension at an angle to the direction of flow of the fluid, and means for introducing another fluid into said duct, said fluid having a path defined by at least one boundary along the axis of flow which lies adjacent to said ends of said vanes to cause mixing of the fluids by the vortex created adjacent the tip of said vanes by the flow of fluid over said vanes.

6. In combination, a combustion chamber having a fluid flowing therethrough, a duct forming the chamber walls, and at least one vane substantially in the form of a wing tip with one spanwise end free and spaced from the wall of the chamber, said vane having its chordwise dimension arranged at an angle to the flow of fluid to cause the formation of a vortex adjacent said free end, and means for introducing fuel to said duct at a point adjacent to said one end of the vane.

7. In a ram jet, a duct forming the walls of the device and having an air inlet end, a part of said duct being the combustion chamber, means for introducing fuel into said duct, and vanes in said duct in the form of wing tips with the tips free and spaced from the walls of the duct and terminating adjacent said fuel introducing means, the vanes having their chordwise dimension at an angle of attack with respect to the fluid flowing through the duct, thereby creating tip vortices having their axes substantially parallel to the axis of flow to mix the fuel and air.

8. In a combustion chamber, a duct forming the chamber walls and having air flowing therethrough, means for introducing fuel into said duct thereby establishing a stream of two different fluids having a mutual boundary, and vanes of airfoil shape extending into the chamber from the duct downstream of said means and having their chordwise dimension at an angle relative to the axis of flow, said vanes terminating in tips adjacent said mutual boundary thereby creating vortices having axes substantially parallel with said boundary to mix the fuel and air.

9. A combustion chamber according to claim 8 including means for introducing added fuel axially of said vortices comprising passage means in said vanes terminating in openings located substantially coincident with the axes of said vortices.

10. In a combustion chamber, a duct forming the chamber walls, means for introducing fuel into the combustion chamber, said fuel having a path defined by at least one boundary, and at least one vane of airfoil shape having a free spanwise end located adjacent said boundary, said vane having its chordwise dimension arranged at an angle of attack relative to the direction of air flow through the duct whereby vortices emanate from said end and travel along said boundary.

11. In a ramjet, a duct forming walls of the device and having an air inlet end, a part of said duct being the combustion chamber, vanes of lift producing cross-sectional shape extending into the chamber from the wall of the duct and having their chordwise dimension at an angle to the axis of flow, said vanes terminating in free vortex producing tips, and means for introducing fuel into said chamber through the vanes including a passage opening into the duct adjacent said tips.

JOHN G. LEE.

REFERENCES CITED

The following references are of record in the file of this patent:

UNITED STATES PATENTS

| Number | Name | Date |
|---|---|---|
| 1,102,510 | Irish | July 7, 1914 |
| 2,041,793 | Stalker | May 26, 1936 |
| 2,047,471 | Hepburn et al. | July 14, 1936 |
| 2,051,099 | Munford | Aug. 18, 1936 |
| 2,097,255 | Saha | Oct. 26, 1937 |
| 2,143,259 | Clarkson | Jan. 10, 1939 |
| 2,252,955 | Woods | Aug. 19, 1941 |
| 2,296,023 | Dallenbach et al. | Sept. 15, 1942 |
| 2,320,576 | Dunn | June 1, 1943 |
| 2,390,959 | Pfenninger | Dec. 11, 1945 |
| 2,398,654 | Lubbock et al. | Apr. 16, 1946 |

FOREIGN PATENTS

| Number | Country | Date |
|---|---|---|
| 222,421 | Germany | May 28, 1910 |
| 554,906 | Germany | Nov. 2, 1932 |
| 568,163 | Germany | Jan. 16, 1933 |